United States Patent
Gavioli

[15] 3,661,026
[45] May 9, 1972

[54] GEAR COUPLING
[72] Inventor: Gabriele Gavioli, Via M. Masia 30, Bologna, Italy
[22] Filed: Nov. 9, 1970
[21] Appl. No.: 128,603

[52] U.S. Cl. .................................................. 74/385
[51] Int. Cl. ............................................... F16h 35/06
[58] Field of Search ....................................... 74/385

[56] References Cited

UNITED STATES PATENTS

| | | | |
|---|---|---|---|
| 2,050,497 | 8/1936 | McCollum | 74/385 |
| 2,235,427 | 3/1941 | Harris | 74/385 |
| 2,755,765 | 7/1956 | Wanzer | 74/385 X |

FOREIGN PATENTS OR APPLICATIONS

| | | | |
|---|---|---|---|
| 1,078,786 | 5/1954 | France | 74/385 |

*Primary Examiner*—Leonard H. Gerin
*Attorney*—Guido Modiano et al.

[57] ABSTRACT

Gear coupling for transmissively connecting two supported shafts comprising a pair of main gears supported by said shafts, respectively, and engaging with a pair of secondary gears, respectively. The secondary gears are carried each by a supporting structure having at least one degree of freedom with respect to the shaft on which the structure is supported, thereby to allow said shafts to assume variable positions relative to one another.

6 Claims, 7 Drawing Figures

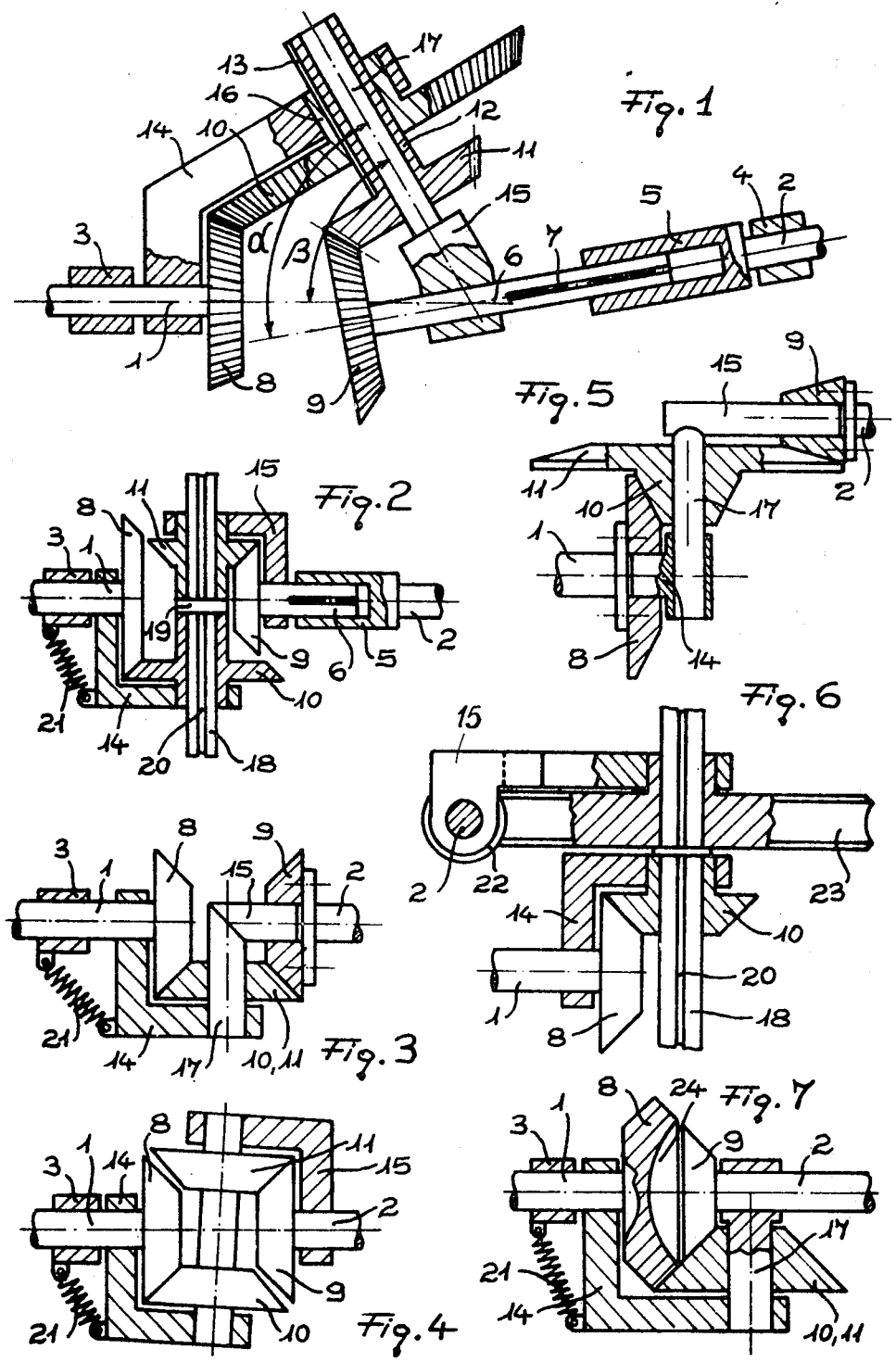

GEAR COUPLING

BACKGROUND OF THE INVENTION

The present invention relates to a gear coupling for operatively connecting two shafts designed to assume variable positions relative to one another.

In mechanic power transmission arrangements, the driving shafts of the drive and operative machines are quite often not aligned to one another and the angle between their respective axes or the minimum distance between the said axes are unknown or are variable during motion. It is also often required that the transmission be as far as possible homokinetic.

At present, when two non-coaxial shafts are to be operatively connected to one another, a universal joint is usually employed. Such joints, however, do not permit large angular deflection or misalignment, except at the cost of notable variations of the angular velocity or high stresses.

Furthermore when the transmission should be homokinetic use is made of specifically designed couplings, such as spheric couplings, which can be carried out only by very expensive working and have a limited field of application.

SUMMARY OF THE INVENTION

One object of the present invention is that of providing a novel coupling which permits an homokinetic transmission of the motion.

Another object of this invention is that of providing a coupling permitting operative connection between two shafts the axes whereof may assume different positions (crossing, parallel, oblique, aligned).

Another object of the present invention is to provide a coupling which permits the operative connection between two shafts even when the relative position of the axes thereof is variable during motion.

According to the invention there is provided a gear coupling for operatively connecting two shafts, characterized in that it comprises a pair of main toothed wheels which are keyed at the ends of the shafts to be connected to one another, and in meshing engagement with respective secondary toothed wheels which are co-axially arranged relative to one another, one of them being axially slidable and rotating together with the other, the said secondary toothed wheels being idly mounted on shaped arms each of which is co-axially pivoted on the shaft carrying the respective main toothed wheel, one of the said arms being resiliently restrained to a fixed point.

BRIEF DESCRIPTION OF THE DRAWING

The invention will be better understood from the following detailed description of a number of preferred not limiting embodiments thereof, reference being made to the accompanying drawing in which:

FIG. 1 is a partially sectional view of a general embodiment of the invention;

FIG. 2–7 show partially sectional views of couplings according to some preferred embodiments.

DESCRIPTION OF THE PREFERRED EMBODIMENTS

With particular reference to FIG. 1, the reference number 1 designates the shaft of the operative machine and 2 the shaft of the driving machine, said shafts 1 and 2 being journalled on supports 3 and 4, rigidly connected to respective frameworks of the relevant machines. It will be understood that in certain contemplated cases it may be necessary that these frameworks assume different positions with respect to each other.

Shaft 2 carries at the free end thereof a bush 5 into which there is inserted a rod 6 arranged to slide axially inside bush 5, but in rigid rotatory relation with the latter through a key 7.

At the end of shaft 1 and of rod 6, are keyed two main, bevel toothed wheels indicated at 8 and 9 respectively, in meshing engagement with secondary bevel toothed wheels 10 and 11, respectively, which are coaxial to each other.

The secondary wheel 11 is provided with a sleeve 12, on which the other secondary toothed wheel 10 is axially slidably mounted, whilst being in rigid rotatory relation therewith by means of a key 13.

The supports for the secondary toothed wheels, 10 and 11, consist of shaped arms 14 and 15, pivoted onto shaft 1 and to rod 6, respectively. In particular, wheel 10 is idly supported at the free end of arm 14 by a lateral bushing 16 whilst wheel 11, with its sleeve 12 is idle on a cylindrical pin 17 of arm 15.

The operation of the described coupling, i.e. the manner in which the transmission of the motion from shaft 2 to shaft 1 occurs, is easily understood from the drawing. In fact, the rotation of driving shaft 2 is transmitted from bevel gear 9 to bevel gear 11 and from the sleeve 12 thereof to bevel gear 10 and therefrom to bevel gear 8 of shaft 1.

As far as the adaptation of the coupling to the respective positions of shafts 1 and 2 is concerned, it is necessary to consider the following.

When this is required by the respective supporting frameworks, shaft 1, with wheel 8 and arm 14, can rotate around wheel 10, whilst shaft 2 carrying the wheel 9 and arm 15 can rotate around wheel 11. As a result of this, shaft 1 may form any angle with shaft 2, comprised between $\alpha - \beta$ and $\alpha + \beta$, $\alpha$ and $\beta$ being the angles which the axis of the pin 17 defines together with shaft 2 and with the axis of shaft 1, respectively. It should be noted that shafts 1 and 2 remain concurrent even whilst rotating relative to one another.

As to misalignment, the minimum distance between shafts 1 and 2, [i.e., between the supports 3 and 4 thereof,] may vary, due to the presence of prismatic joints i.e., the coupling of staff 6 in bush 5 and of wheel 10 in sleeve 12), from zero to a value depending upon the permitted axial stroke of said prismatic joints, upon angles $\alpha$ and $\beta$ and upon the angle formed by shafts 1 and 2.

For instance in the case of $\alpha - \beta = 0$, the misalignment of shafts 1 and 2, when displacing one parallel to the other is given by $s \cdot \sin \alpha$, $s$ being the distance between the secondary toothed wheels 10 and 11. At the same time, the main toothed wheels, 8 and 9, are moved apart for a distance $s \cdot \cos \alpha$, as rod 6 can penetrate into bush 5. It is evident from the above that, whatever the relative position of shafts 1 and 2, the bevel gears 8, 10 and 9, 11 work always in the same conditions and consequently the ratio between the angular velocities of the toothed wheels 8 and 9 is strictly constant, which means that the transmission is strictly homokinetic.

It should be noted that the embodiment of FIG. 1 has the following limitations. When the axes of shafts 1, 2 and of pin 17 lie in the same plane, as is the case of FIG. 1, this configuration does not allow variations of the angle between shafts 1 and 2, in the considered plane, as it is often necessary in practice. In addition, when shafts 1 and 2 are aligned, arms 14 and 15 are not prevented from rotation, owing to which the resisting force of the operative machine stops the toothed wheel 8 and the arms 14 and 15 are caused to rotate thereabout by the action of driving gear 9, so that the power transmission is lost in friction. Two solutions have been found to eliminate these shortcomings. The first one involves the exclusion of parallelism between shafts 1 and 2 from the possible configurations during the power transmission. If, on the other hand, it is necessary to maintain as an average configuration the coplanarity of the axes of shafts 1, 2 and of pin 17, it is sufficient to anchor elastically arm 14 to the framework of the machine.

FIGS. 2–7 illustrate some practical embodiments of coupling deriving from the more general one shown in FIG. 1. In FIG. 2–7, structurally and functionally similar elements as those shown in FIG. 1, are indicated by the same reference numerals.

FIG. 2 shows an embodiment which is particularly suitable for shafts that can assume variable position relative to one another, and having a normal position in which they are on the average parallel. By modifying the transmission ratio of the bevel gear pairs, the solution as illustrated can be employed for any axis on the average perpendicular to one another, for instance, in the latter case, assuming that Z9/Z11 = Z8/Z10 <<1 an angular movement is obtained equal to ± (90° − 2 arctg Z9/Z11), where Z8, Z9, Z10 and Z11 are the numbers of teeth of the respective gears 8 through 10. It should be noted that, in FIG. 2, the coupling between the toothed wheels 10 and 11 is obtained by means of a cylindrical bar 18, provided with end stroke limits, not shown.

The said bar 18 has a central collar 19 and grooves 20 which permit a rigid rotatory relation and an axial sliding of wheels 10 and 11. In order to prevent idle functioning in case of alignment of shafts 1 and 2, there is foreseen a spring 21, anchored with its ends on arm 14 and on support 3 fastened to the box of the operating machine. Of course, the elastic check can be assured in any other suitable manner.

It will be understood that, when shafts 1 and 2 have to be tilted with respect to each other by a great angle, it will be advisable to carry out the tilting operation while the transmission of power is discontinued. However it will be possible to carry out the tilting operations also without stopping the transmission of power, by properly calculating of the gears in order to withstand the stresses which take place due to the tilting of the shafts. Suppose, for instance, that the framework carrying the support of shaft 2 of FIG. 2 has to be displaced so that shaft 2 assumes a position perpendicular to shaft 1 starting from the aligned position of shafts 1 and 2, shown in FIG. 2.

By virtue of the structure of this invention it will be possible to carry out this transformation without dismounting the gear assembly. In fact after stopping the power transmission it will be sufficient to turn the squared arm 14 through 90° about the shaft 1 together with the assembly 18, 10, 11, 15. In this position it will be possible to rotate shaft 2 in the plane of the drawing either in a clockwise or a counterclockwise direction through 90° together with gear 9 and arm 15. Obviously it is possible first to rotate shaft 2 in a plane perpendicular to bar 18 and afterwards in a plane perpendicular to the shaft 1. It is also possible to carry out these operations simultaneously.

FIG. 3 shows one embodiment, wherein the wheels 10, 11, are reduced to a single wheel, and the wheels 8 and 9 — when coaxial — rotate in opposite directions. Such coupling is suitable for concurrent axes which form angles up to 90°. When modifying the transmission relations in a similar manner as that described in relation to the previous Figure, the solution as shown in FIG. 3 is designed for the normal transmission of the motion between concurrent, medially perpendicular axes.

FIG. 4 shows an embodiment for concurrent shafts from 0 to 90°. This embodiment offers with even transmission power a more compact structure.

FIG. 5 represents a coupling with reduction gears for oblique shafts with a minimum fixed distance, wherein arm 14 is directly connected with pin 17. It permits angles between shafts 1 and 2 going from 0 up to 180° in both directions and does not require elastic spring 21 because the position of pin 17 is unequivocally defined by the position of shafts 1 and 2.

In FIG. 6 there is shown as an example a coupling employing a pair of gears, comprising a worm 22 and a helicoidal wheel 23, corresponding to the bevel gears 9, 11. Of course, arm 15 will have to be suitably shaped in order to support hingedly screw 22. Also in this embodiment, as in the coupling of FIG. 2, a bar 18 is provided formed with grooves 20, whilst the spring 21 is omitted, since the worm 22 prevents any idle functioning. The coupling is suitable for any movement between shafts 21 and 22, however it does not allow an approach between shafts 1, 2 beyond that which has been illustrated, in which said shafts do indeed have a minimum approach distance.

Finally FIG. 7 represents a coupling similar to that of FIG. 3, in which, however, wheels 8 and 9, being disposed on the same side with respect to pin 17, rotate in the same direction. In order to permit the rotation of wheel 9 around pin 17, a cavity in the form of a spheric cap 24 is formed into wheel 8, the center of said cavity being in the crossing point of the axes of pin 17 and shaft 1 or 2.

I claim:

1. A gear coupling for operatively connecting two shafts including on each of said shafts a main toothed wheel in rigid rotatory relation therewith, secondary toothed wheels in mesh with said main toothed wheels respectively, and supporting members for said secondary wheels, wherein, according to the improvement, said secondary toothed wheels are coaxially arranged with respect to each other and have connection means providing a rigid rotatory relation for said secondary toothed wheels and allowing axial movement thereof and wherein said supporting members comprise a shaped arm for each of said secondary toothed wheel, said shaped arm being pivoted on one of said shafts and idly supporting the respectives of said secondary toothed wheels, one of said arms having restraining means for urging said arm in a fixed position.

2. A coupling according to claim 1, wherein said connection means comprise a splined sleeve rigid with one of said secondary wheel and coaxial therewith and cooperating with the other of said secondary wheels.

3. A coupling as claimed in claim 1, wherein the planes of the main toothed wheels are perpendicular to the planes of the relative secondary toothed wheels and wherein said connection means is a coaxial rod.

4. A coupling as claimed in claim 1 wherein the said two secondary toothed wheels are incorporated in a single toothed wheel and wherein the main toothed wheels, in alignment with the shafts, are geared with said single toothed wheel at positions which are diametrically opposed with respect to the rotation axis of the latter.

5. A coupling as claimed in claim 1, wherein the two secondary toothed wheels are incorporated in a single toothed wheel, and wherein the main toothed wheels, in alignment with said shafts, are in meshing engagement with said single wheel, at points lying on the same side as the rotation axis, the main toothed wheel placed more externally having a cap-shaped cavity, whose center is situated at the crossing point of the axis of any one of the said two shafts with the rotation axis of said single wheel.

6. A coupling as claimed in claim 1, wherein one of said shafts is a driving shaft wherein the main toothed wheel keyed onto the driving shaft and the said secondary toothed wheel meshing therewith, comprise respectively, a worm screw and an helicoidal wheel.

* * * * *